US005159831A

United States Patent [19]

Kitagawa et al.

[11] Patent Number: 5,159,831

[45] Date of Patent: Nov. 3, 1992

[54] DEVICE FOR CORRECTING ERROR BETWEEN ACCELERATOR PEDAL POSITION SENSOR AND THROTTLE VALVE POSITION SENSOR

[75] Inventors: Hiroshi Kitagawa; Tetsuya Oono; Norio Suzuki, all of Wako, Japan

[73] Assignee: Honda Giken Kogyo Kabushiki Kaisha, Tokyo, Japan

[21] Appl. No.: 741,905

[22] Filed: Aug. 8, 1991

[30] Foreign Application Priority Data

Aug. 8, 1990 [JP] Japan ................................ 2-210855

[51] Int. Cl.[5] ........................................... G01M 15/00

[52] U.S. Cl. .................................. 73/118.1; 123/399

[58] Field of Search ................. 73/117.2, 117.3, 118.1; 123/399

[56] References Cited

U.S. PATENT DOCUMENTS 5,048,481 9/1991 Chan et al. .................... 73/118.1 X

FOREIGN PATENT DOCUMENTS 56-107926 8/1981 Japan .
2-31476 2/1990 Japan .
2-119542 5/1990 Japan .

*Primary Examiner*—Jerry W. Myracle
*Attorney, Agent, or Firm*—Armstrong & Kubovcik

[57] ABSTRACT

A device for correcting errors between an output value from an accelerator pedal position sensor for detecting the operating position of an accelerator pedal of a vehicle, and an output value from a throttle valve position sensor for detecting the rotational position of a throttle valve installed in an intake pipe of an engine mounted on the vehicle. The output value of one of the sensors is compared with reference values consisting of a plurality of different values when the accelerator pedal and the throttle valve are operating in a 1:1 correspondence. When one of the sensor output values corresponds to one of the reference values as a result of the comparison, the output value of the other of the sensors is learned for each of the reference values. The output value from the other sensor is corrected by the learned values.

5 Claims, 6 Drawing Sheets

DEVICE FOR CORRECTING ERROR BETWEEN ACCELERATOR PEDAL POSITION SENSOR AND THROTTLE VALVE POSITION SENSOR

BACKGROUND OF THE INVENTION

This invention relates to a method of correcting the error between an accelerator pedal position sensor and a throttle valve position sensor in a vehicle and an internal combustion engine where the throttle valve is controlled not only by the position of the accelerator pedal, but also by a means independent of the accelerator pedal.

A device which learns values output by a throttle valve position sensor of an internal combustion engine when the throttle valve is fully closed, and corrects the values output by the sensor based on the learned values so as to remove errors between the values output by the sensor and actual values of the throttle valve position, is disclosed for example in Japanese Provisional Patent Publication (Kokai) No. 56-107926.

In general, a throttle valve of an internal combustion engine for automotive vehicles is controlled by the accelerator pedal, but if the vehicle driving wheel or wheels slip due to the road conditions, the engine output must be temporarily reduced to eliminate the slip quickly. For this purpose, a traction control system (referred to hereinafter as TCS) is known in the art which controls the throttle valve to a smaller opening independently of the action of the accelerator pedal. With this system, the throttle valve normally rotates in a 1:1 correspondence with the action of the accelerator pedal, but when the driving wheel or wheels slip, a pulse motor drive connected to the throttle valve releases the valve from the accelerator pedal drive to rotate it by a predetermined amount toward the closed side.

The accelerator pedal and throttle valve are both provided with sensors that detect rotational angular position thereof. The difference between the values output by these to sensors is used to observe whether the accelerator pedal and throttle valve are moving with a 1:1 correspondence, as proposed e.g. by the assignee of the present application in Japanese Patent Application No. 2-119542, and to determine the initial position of the pulse motor (e.g. proposed by the assignee of the present application in Japanese Utility Model Application No. 2-31476).

However, if there are errors between the values output by the accelerator pedal angle sensor, throttle valve angle sensor and the respective actual angular positions of the accelerator pedal and throttle valve, and an error in the relative position of the accelerator pedal and throttle valve, the difference between the values output by the two sensors could be as much as the sum of the three errors. If the observation and determination are based on differences containing these errors, therefore, there is a risk that the performance of the vehicle and engine might deteriorate.

If the aforesaid conventional technique for correcting the output value of the throttle valve position sensor is applied to the above two angle sensors, the errors in their output values can be corrected. However, if the error in the difference between values output by the two angle sensors also contains elements due to a shift in the relative position of the accelerator pedal and throttle valve, a difference (relative error) corresponding to the shift appears in the output values of the two sensors even if the accelerator pedal and throttle valve are moving with a 1:1 correspondence, and a deterioration of the vehicle's performance is unavoidable.

Further, by the aforesaid conventional technique for correcting the output value of the throttle valve sensor, the sensor output value is learned when the throttle valve is fully closed, and sensor output values are corrected based on this learned value. In general, however, the error in the sensor output value varies with the opening of the throttle valve, and if the output value is corrected only on the basis of the value learned when the throttle is fully closed, the output value may not be correct for other throttle openings. Even if the conventional correction technique is applied to the above two angle sensors, therefore, the output values cannot be corrected over the whole range of throttle openings.

SUMMARY OF THE INVENTION

It is the object of the invention to provide a device which, by making the relative error in the values output by the accelerator pedal position sensor and the throttle valve position sensor very small over the entire range of throttle openings, corrects the error between the accelerator pedal position sensor and throttle valve position sensor.

To attain the above object, the present invention provides a device for correcting errors between an output value from an accelerator pedal position sensor for detecting an operating position of an accelerator pedal of a vehicle, and an output value from a throttle valve position sensor for detecting a rotational position of a throttle valve installed in an intake pipe of an engine mounted on the vehicle.

The device comprises comparison means for comparing the output value of one of the sensors with reference values consisting of a plurality of different values when the accelerator pedal and the throttle valve are operating in a 1:1 correspondence, learning means operable when one of the sensor output values corresponds to one of the reference values as a result of a comparison made by the comparison means, for learning the output value of the other of the sensors for each of the reference values, and correcting means for correcting the output value from the other sensor by learned values provided by the learning means.

Preferably, when the output value of the one of the sensors coincides with one of the reference values, the learning means performs the learning if a difference between the output values of the sensors is equal to or less than a first predetermined value, and does not perform the learning if it is greater than the first predetermined value.

Also preferably, the learning means initializes one of the learned values when a difference between one of the reference values and a corresponding value learned by the learning means is greater than a second predetermined value.

Further preferably, the first and second predetermined values are identical, and are set for each of the reference values.

The first and second predetermined values are set according to permissible errors which can be produced mechanically by the sensors.

The above and other objects, features and advantages of the invention will become more apparent from the ensuing detailed description taken in conjunction with the accompanying drawings.

Figure 1:
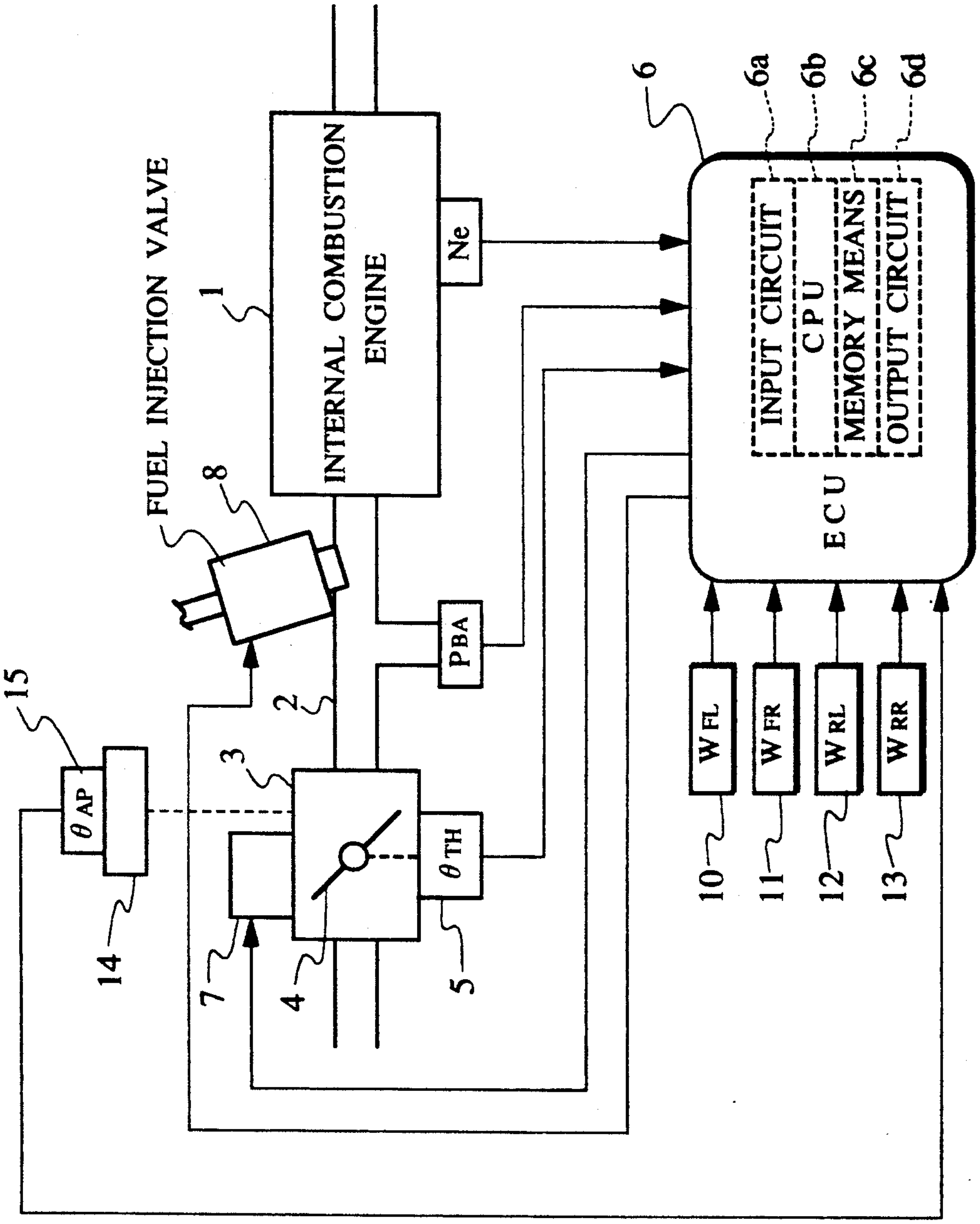
FIG. 1 is a block diagram of a traction control system (TCS) including an inter-sensor error correction device of the invention.
Figure 2A:
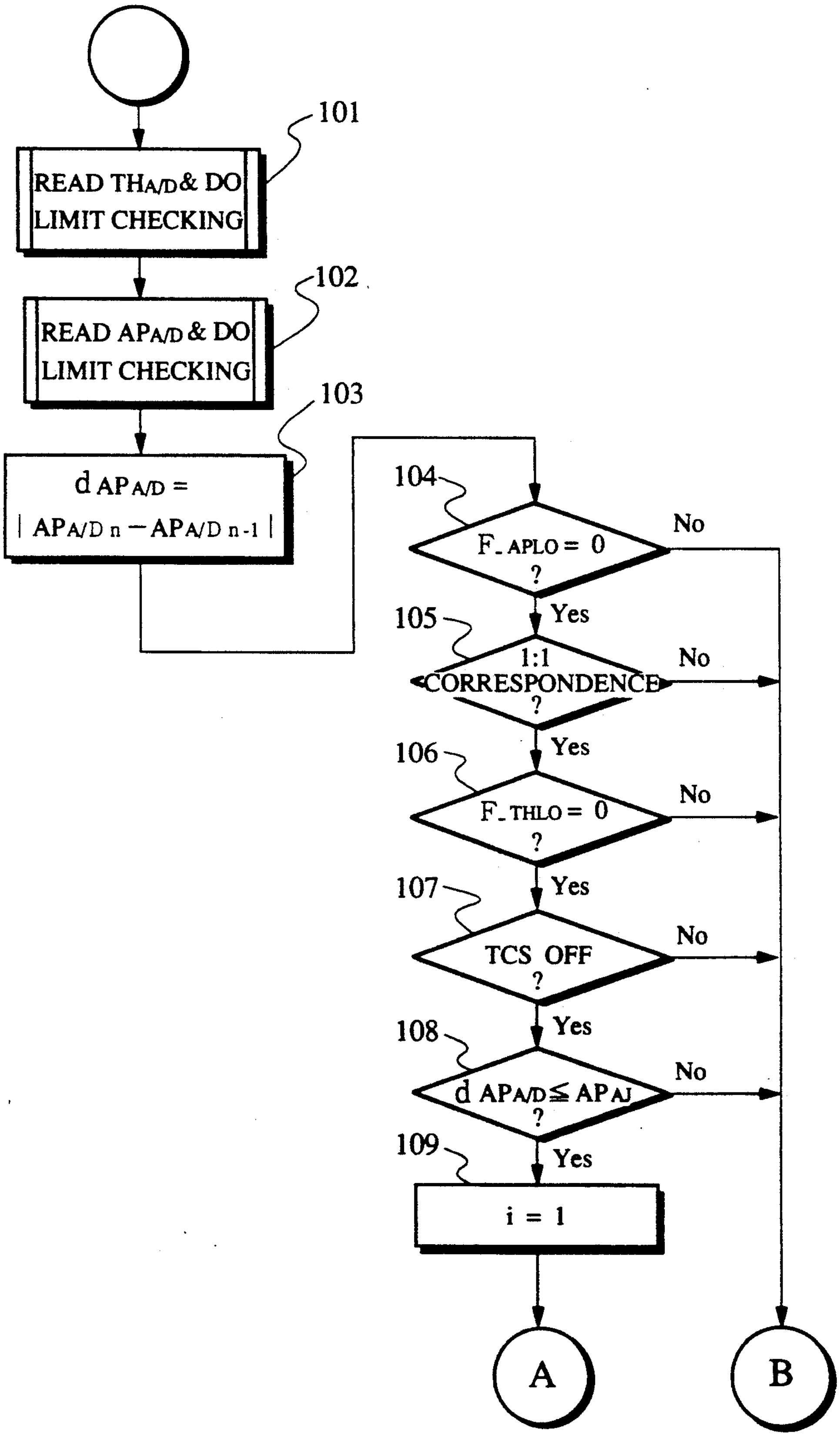
Figure 2B:
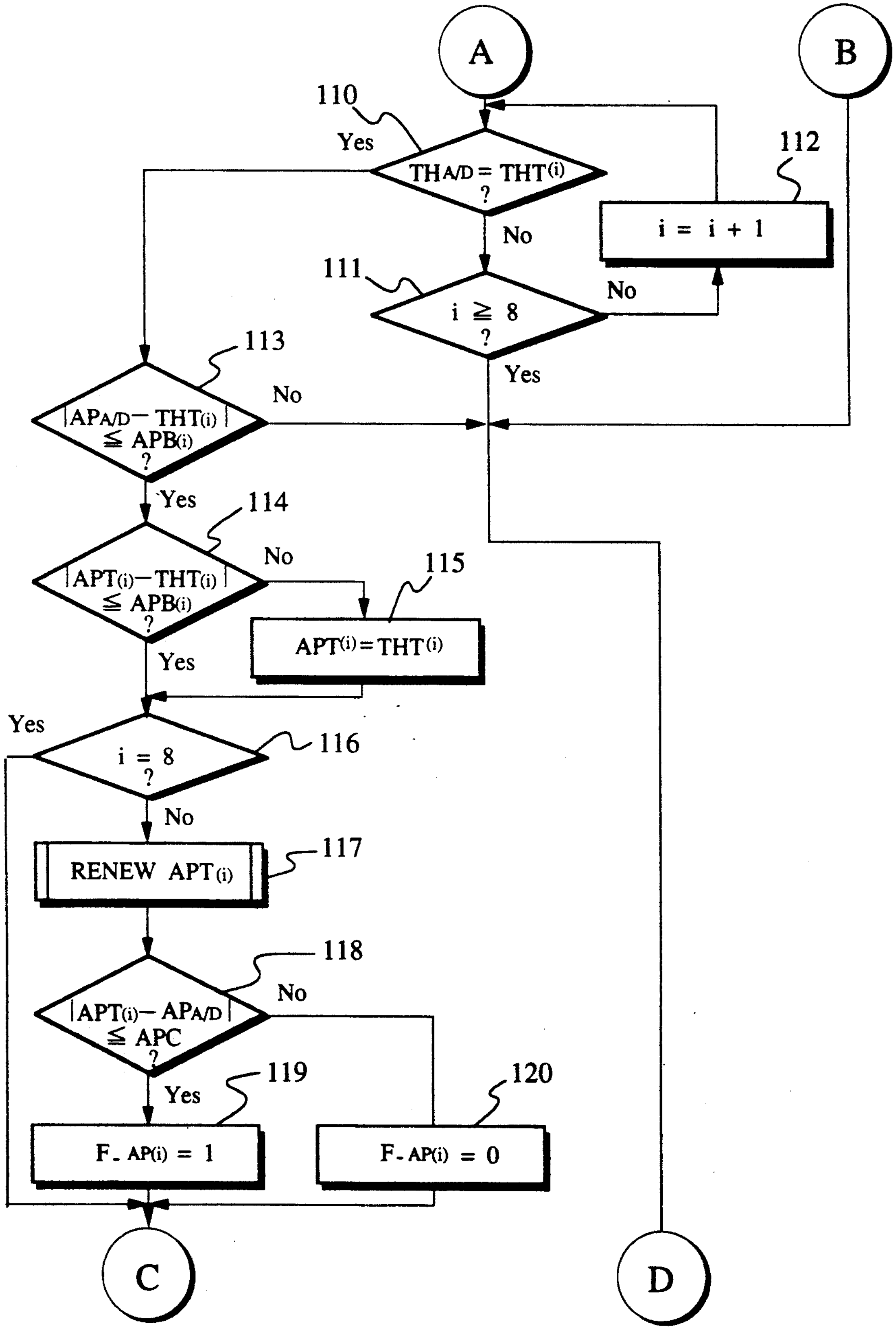
Figure 2C:
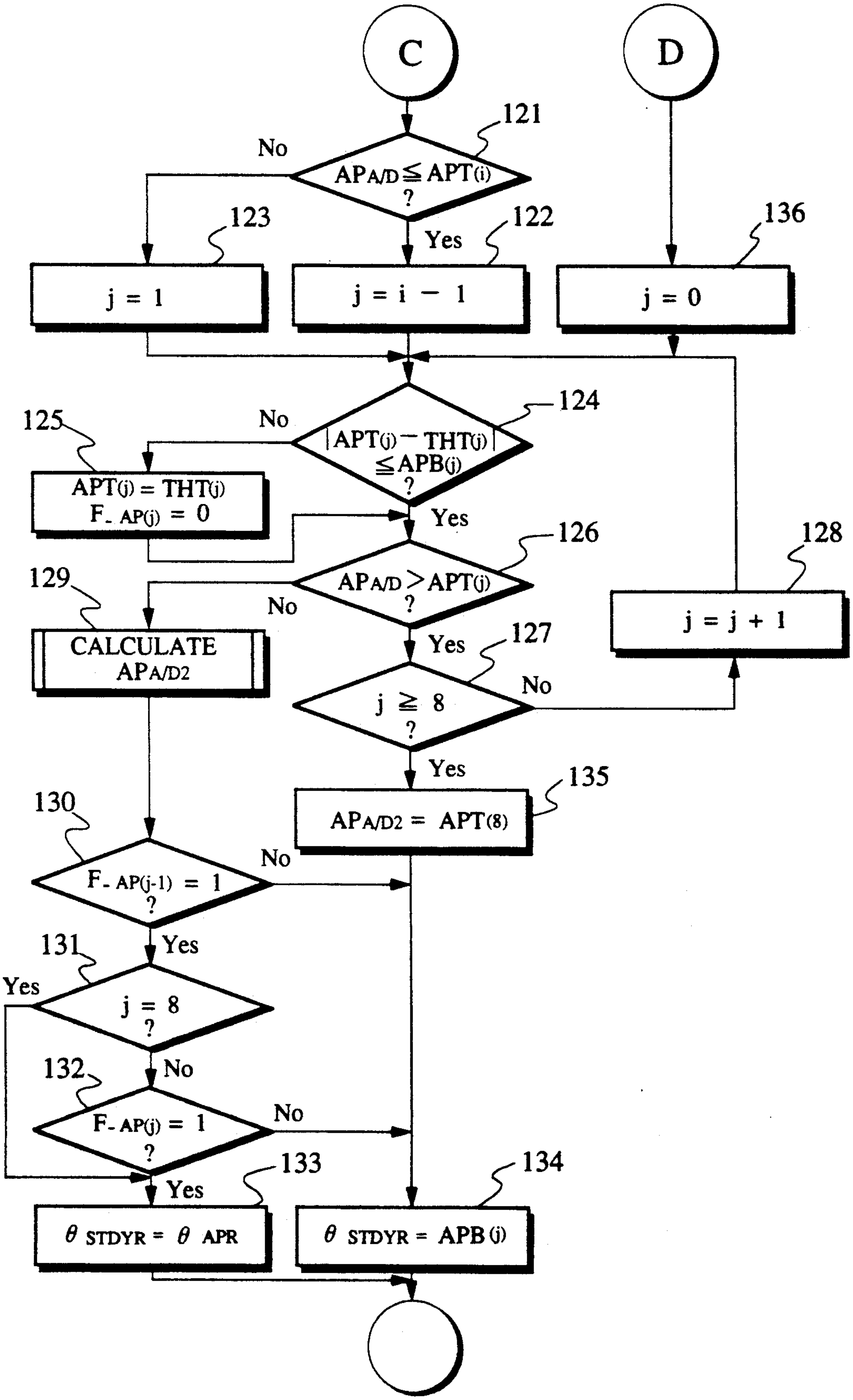
Figure 3:
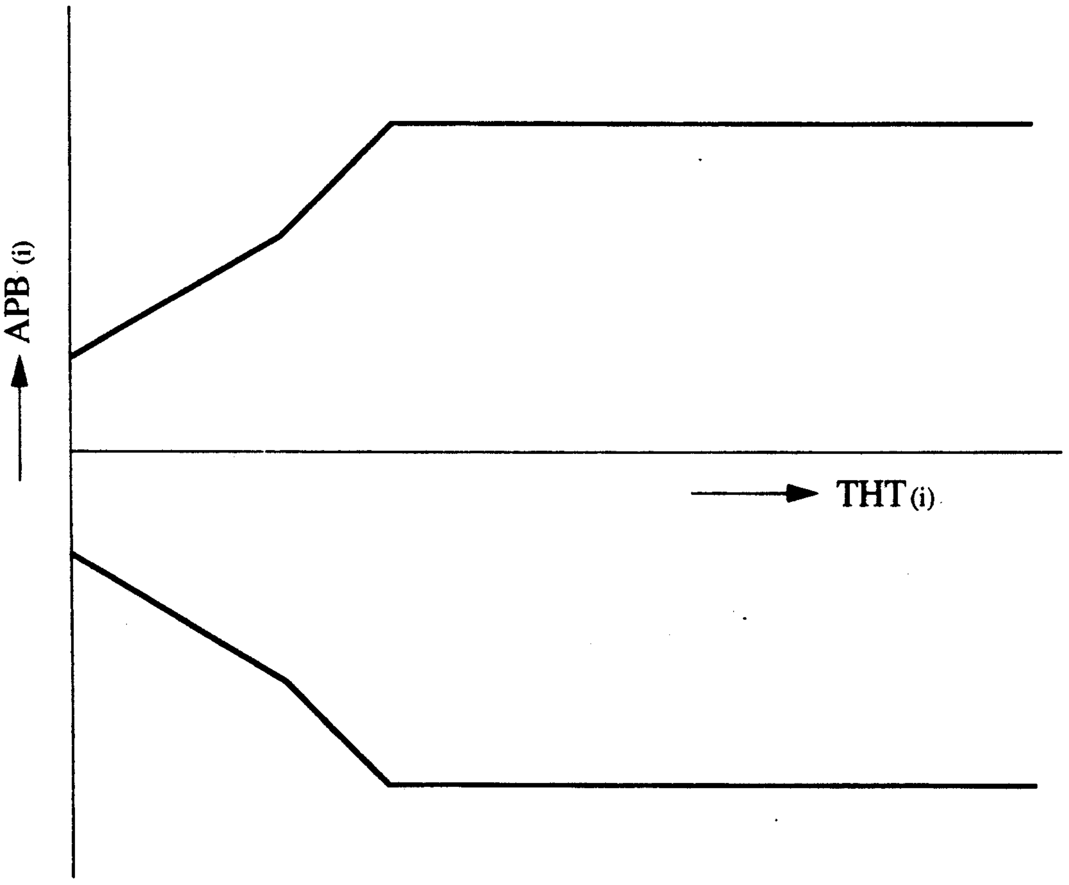
Figure 4:
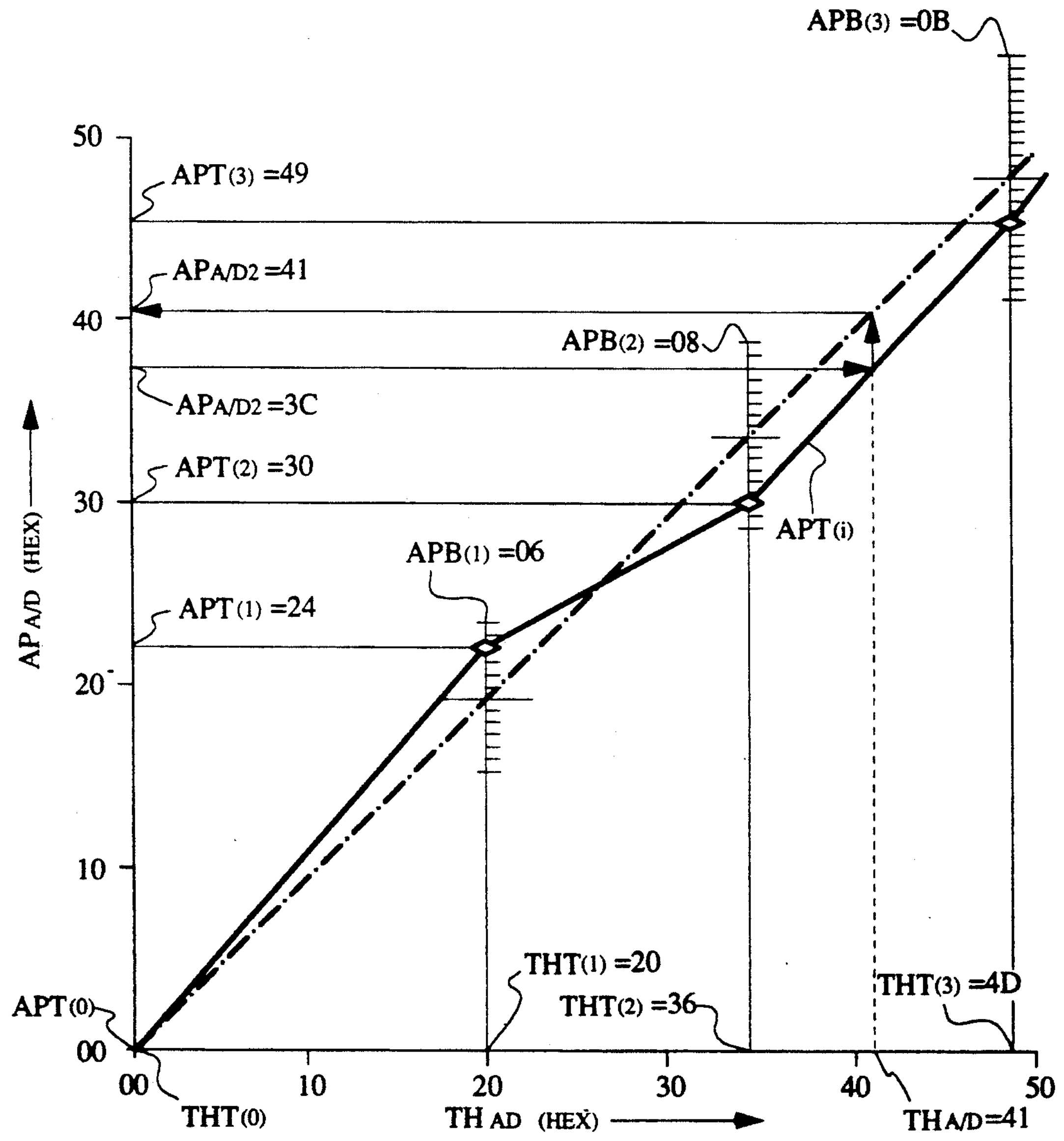

FIG. *2a, 2b* and *2c* are control program flowcharts showing the error correction procedure executed by a CPU *6b* in FIG. 1;

FIG. 3 shows a table for setting a permissible relative error APB(i) in a step 113 of FIG. 2; and FIG. 4 is a graph showing a process used in learning by means of grid points APB(i) and determining corrected values $AP_{A/D2}$.

DETAILED DESCRIPTION

The invention will now be described in detail with reference to the drawings showing an embodiment thereof.

FIG. 1 is a block diagram of a traction control system (TCS) including an inter-sensor error correction device according to this invention. A throttle body 3 is installed in an intake pipe 2 of an internal combustion engine 1 for an automotive vehicle, and a throttle valve 4 is disposed in the throttle body. A throttle valve opening (position) sensor 5 is connected to the throttle valve 4, and sends an analog electrical signal depending on the opening ($\theta_{TH}$) or rotational position of the throttle 4 to an electronic control unit 6 (referred to hereinafter as the ECU).

An accelerator pedal 14 installed in the vehicle is connected to the throttle valve 4 by a wire, not shown, via a lost motion mechanism, not shown. An accelerator pedal angular position sensor 15 is connected to the accelerator pedal 14, and outputs an analog electrical signal depending on the angular position ($\theta_{AP}$) of the pedal !4 to the ECU 6. The construction is such that, provided there is no error in values output by the throttle valve opening sensor 5 and accelerator pedal angular position sensor 15, the two sensors should output the same values when the throttle valve 4 and accelerator 14 are operating with a 1:1 correspondence.

A pulse motor 7 which drives the throttle valve 4 independently of the action of the accelerator pedal 14 based on a control signal from the ECU 6, is also connected to the throttle valve 4.

Wnen the TCS is not functioning (i.e. during normal running), the throttle valve 4 is operated by the accelerator pedal 14 without the intermediary of the lost motion mechanism, and the throttle valve rotates to an angular position which corresponds to the angular position of the pedal 14. When the TCS is functioning (i.e. when slip of the driving wheel(s) is detected), the throttle valve is driven and controlled by the pulse motor 7 as will be described hereinafter, he lost motion mechanism functions, and the angular position of the throttle valve 4 no longer corresponds to the angular position of the pedal 14.

Fuel injection valves 8 are provided respectively for engine cylinders at locations between the engine 1 and the throttle valve 4, and also slightly upstream of respective intake valves, not shown, in the intake pipe 2. These injection valves are connected to a fuel pump, not shown, and are electrically connected to the ECU 6 to have valve opening periods thereof controlled by signals from the ECU 6.

Driving wheel speed sensors 10, 11 which detect the rotational speeds $W_{FL}$, $W_{FR}$ of left and right driving wheels, not shown, and driven wheel speed sensors 12, 13 which detect the rotational speeds $W_{RL}$, $W_{RR}$ of left and right driven wheels, not shown, are also connected to the ECU 6 and supply output signals to the ECU 6.

In this embodiment, the ECU 6 comprises a comparison means, a learning means, and a correction means.

The ECU 6 comprises an input circuit *6a* which shapes input signals from various sensors, corrects voltage levels of input signals from some sensors to a predetermined level, and converts analog signal values from analog output sensors to digital signal values (A/D conversion), a central processing circuit *6b* (referred to hereinafter as the CPU) which executes an inter-sensor error correction program described hereinafter, a memory means *6c* which stores computing programs executed by the CPU *6b* and computation results, and an output circuit *6d* which supplies driving signals to the fuel injection valves 8 and pulse motor 7. In the input circuit *6a*, the input signals from the throttle valve opening sensor 5 and accelerator pedal opening sensor 15 undergo A/D conversion, and become values $TH_{A/D}$, $AP_{A/D}$ respectively. Further, the memory means $6_c$ comprises an ROM, a RAM, and a battery back-up RAM. Learning reference grid points THT(i) and permissible relative errors APB(i) described hereinafter are stored in the ROM, and learning grid points APT(i) described hereinafter are stored in the battery back-up RAM.

The ECU 6 computes an average value $V_W$ of the left and right driving wheel speeds ($=(W_{FL}+W_{FR})/2$), and an average value $V_V$ of the left and right driven wheel speeds ($=(W_{RL}+W_{RR})/2$) from the values detected by the sensors 10–13, and computes a slip factor λ of the driving wheels with respect to the road surface from these computed averages $V_W$, $V_V$ based on equation (2) below:

$$\lambda = \frac{V_W - V_V}{V_W} \quad (2)$$

If the slip factor λ exceeds a predetermined value (e.g. 5%), the ECU 6 outputs a control signal to the pulse motor 7 so as to drive the throttle valve opening $\theta_{TH}$ in the reduction direction, reduce the engine output torque and eliminate the slip.

This system uses the difference between the sensor output values $TH_{A/D}$, $AP_{A/D}$ based on the input signals from the throttle valve opening sensor 5 and the accelerator pedal position sensor 15, to observe whether there is a 1:1 correspondence between the accelerator pedal 14 and the throttle valve 4 when no control signal is sent to the pulse motor 7, i.e. when the TCS is OFF, and to determine the initial position of the pulse motor 7. The ECU 6 performs error corrections on the difference between the sensor output values $TH_{A/D}$, $AP_{A/D}$ in order that this observation and determination are accurate.

The above error correction procedure will now be described with reference to the control program flowchart illustrated in FIGS. *2a, 2b* and *2c*. This program is executed by the CPU *6b* at fixed time intervals (e.g. 15 ms) by a timer built into the ECU 6.

First, at a step 10*i*, the throttle sensor output value $TH_{A/D}$ obtained by performing A/D conversion of the input signal from throttle valve opening sensor 5 is read, and it is determined whether $TH_{A/D}$ is within a predetermined range defined by upper and lower limits. If it is within this range, a flag $F_{-THLO}$ is set to 0, and if it is not, the flag $F_{-THLO}$ is set to 1. Similarly at a step 102, the accelerator pedal sensor output value $AP_{A/D}$ obtained by performing A/D conversion of the input signal from the accelerator pedal position sensor 15 is read, and it is determined whether $AP_{A/D}$ is within a predetermined range defined by upper and lower limits. If it is within this range, a flag $F_{-APLO}$ is set to 0, and if it is not, the flag $F_{-APLO}$ is set to 1. At a step 103, the absolute value of the difference between the accelerator pedal position sensor output value $AP_{A/D}$ read at step 102 in the present loop of the program, $AP_{A/Dn}$, and the value in the immediately preceding loop, $AP_{A/Dn-1}$, is computed. Let the result of this computation be $dAP_{A/D}$.

The following steps 104 to 108 are performed prior to correcting errors in the deviation of the throttle sensor output value $TH_{A/D}$ from the accelerator pedal position sensor output value $AP_{A/D}$, and determine whether or not the operation of the vehicle or engine is suitable for the learning of the accelerator pedal position sensor output value $AP_{A/D}$, described hereinafter.

These steps determine whether or not the flag $F_{-APLO}$ set at the step 102 is 0 (step 104), whether or not the accelerator pedal 14 and throttle valve 4 are operating with a 1:1 correspondence (step 105), whether or not the flag $F_{-THLO}$ set at the step 101 is 0 (step 106), whether or not the TCS is OFF, i.e. whether or not the pulse motor 7 is inoperative (step 107), and whether or not the value $dAP_{A/D}$ computed in the step 103 is less than or equal to a predetermined value $AP_{AJ}$ (step 108). The determination of the correspondence relationship at the step 105 may for example be made on the basis that no sticking is detected as disclosed in Japanese Patent Application No. 2-119542 (when the throttle valve sticks temporarily due to the lost motion mechanism, and does not open even if the accelerator pedal is depressed), or that no variation of the throttle valve opening occurs corresponding to the variation of the accelerator pedal position. Further, the determination at the step 108 is based on the face that, when the motion of the accelerator pedal 14 is very rapid, other errors may occur due to the timing difference with which sensor output values are read in addition to the difference between the sensor output values $TH_{A/D}$ and $AP_{A/D}$, and it is not appropriate to perform the heretoforementioned learning process at such a time.

If any of the answers at steps 104 to 108 is negative (No), i.e. if there is a fault in the sensors 5 or 15, or if the accelerator pedal 14 is not operating in a 1:1 correspondence with the throttle valve 4 so that the condition is unsuitable for learning, the program proceeds to a step 136 without performing the learning. If on the other hand all the answers at the steps 104 to 108 are affirmative (Yes), a control parameter i corresponding to the ordinal number of THT(i) is set to 1 (step 109), and it is determined whether the throttle sensor output value $TH_{A/D}$ read in step 101 coincides with a first learning reference grid point THT(1) (step 110). These learning reference grid points THT(i) are for example 7 check points (i=1–7) previously chosen from values corresponding to throttle valve opening sensor output values $TH_{A/D}$ generated between the fully closed and fully open positions of the throttle valve 14, and memorized in the ROM. Further, THT(0) is set to 00, and THT(8) is set to a value FF which is slightly greater than the maximum value that the throttle sensor output value $TH_{A/D}$ can take (expressed in hexadecimal notation).

If the answer at the step 110 is negative (No), it is determined whether or not the control parameter i is 8 or more (step 111), while if this answer is negative (No), the control parameter i is incremented by 1 (step 112), and the program returns to the step 110. Thus, by execution of the steps 110 to 112, it is determined whether or not the throttle valve opening sensor output value $TH_{A/D}$ coincides with one of the previously set learning reference grid points THT(i) (i=1–7). If it does not coincide with any of them (the answer at step 111 is Yes), the program proceeds to a step 136 without performing the learning process described hereinafter.

If on the other hand the answer at the step 110 is affirmative (Yes), it is determined whether the absolute value of the difference between the learning reference grid point THT(i) which has the present value of i and the accelerator pedal output value $AP_{A/D}$ read in the above step 102, is no greater than a permissible relative error APB(i) (first predetermined value) (step 113). This permissible relative error APB(i) is a value set by a table shown in FIG. 3, is determined for each of several learning reference grid points THT(i), and is based on permissible errors which could be produced mechanically by the throttle valve opening sensor 5 and the accelerator pedal position sensor 15, such as errors due to manufacturing tolerances and aging.

If the answer at the step 113 is negative (No), it is determined that the accelerator pedal position sensor output value $AP_{A/D}$ is not suitable for learning, i.e. that $AP_{A/D}$ is greater than the sum of the maximum values of all the mechanical errors, and the program proceeds to the step 136. If on the other hand the answer at step 113 is affirmative (Yes), it is determined whether or not the absolute value of the difference between the learning reference grid point THT(i) having the value of i when the answer at the step 110 was affirmative, and a learning grid point APT(i) corresponding to the THT(i), described hereinafter which was obtained in the previous execution and memorized in the back-up RAM, is no greater than the permissible relative error APB(i) (second predetermined value) (step 114).

If the answer at the step 114 is negative (No), the learning grid point APT(i) is deemed to have changed due to noise or other factors while it was being memorized in the back-up RAM, so it is cleared and the learning grid point THT(i) is memorized as a new APT(i) (step 115). If on the other hand the answer at the step 114 is affirmative (Yes), the program skips the step 115 and proceeds to a step 116.

At the step 116, it is determined whether or not the control parameter i is 8, i e whether or not i was 8 when the response at step 110 was affirmative. If this answer is negative (No), the ith learning grid point APT(i) is renewed based on the following equation (3) at a step 117:

$$APT(i)=\alpha_{AP}AP_{A/D}+(1-\alpha_{AP})APT(i) \quad (3)$$

where the learning grid point APT(i) is a learning value obtained by learning the accelerator pedal position sensor output value $AP_{A/D}$ for each of several learning reference grid points THT(i) and memorizing it in the back-up RAM, αAP is a predetermined value from 0 to 1 (e.g. 0.3), and the APT(i) on the right-hand side of the equation is the ith learning grid point obtained up to the time when the program was executed last time.

In the following step 118, it is determined whether or not the absolute value of the difference between the learning grid value APT(i) renewed in the step 117 and the accelerator pedal position sensor output value $AP_{A/D}$ read in the step 102, is no greater than a predetermined value APC (e.g. a value corresponding to 2.4°), i.e. it is determined whether or not the discrepancy between APT(i) and the actual value $AP_{A/D}$ has become so small that it is less than or equal to the predetermined value APC due to continued learning of the grid points APT(i). If this answer is affirmative (Yes), learning is deemed to be complete and a flag $F_{-AP(i)}$ is set to 1 (step 119); if the answer is negative (No), learning is deemed to be incomplete and the flag $F_{-AP(i)}$ is set to 0 (step 120). The program then proceeds to a step 121.

If on the other hand the answer at the step 116 is affirmative (Yes), the steps 117 to 120 are not executed, and the program proceeds to the step 121. THT(8) is normally set to a value which the throttle valve opening sensor output value $TH_{A/D}$ cannot take, and therefore when i=8, the answer at the step 110 is not likely to be affirmative. However, if it is affirmative due for example to a large error in the throttle valve opening sensor output value $TH_{A/D}$, APT(8) is not renewed to a learning value in the step 117 but used as it is, i.e. as a fixed value.

At the step 121, it is determined whether or not the accelerator pedal position sensor output value $AP_{A/D}$ read in the step 102 is less than or equal to the learning grid point APT(i) having the value of i when the answer at the step 110 was affirmative. If this answer is affirmative (Yes), a value i−1 is assigned to a control parameter j used in the following steps 125 to 134 (step 122). If on the other hand the answer at the step 121 is negative (No), the value i is assigned to the control parameter j (step 123) and the program proceeds to a step 124. The above steps 121–123 facilitate execution of the following steps 124–128 that are intended to determine which of the several intervals between learning grid points APT(i) the sensor output value $AP_{A/D}$ falls in.

At the steps 124 and 125, the same processing is carried out as at the steps 114 and 115. This allows for the case where the program has reached the step 124 without executing the steps 114 and 115. In the step 125, a flag $F_{-AP(j)}$ is set to 0 to express the fact that the jth learning grid point APT(j) has not been completely learned.

At the next step 126, it is determined whether or not the sensor output value $AP_{A/D}$ is greater than the jth learning grid point APT(j). If the answer at this step 126 is initially affirmative (Yes) due to execution of the steps 121–123, the program proceeds to the step 127 where it is determined whether or not the control parameter j is greater than or equal to 8. If the answer is initially negative (No), the control parameter j is incremented (step 128) and the program returns to the step 124. If the answer when the step 126 is executed again, is negative (No), the program proceeds to the step 129. Thus, the step 124 (and the step 125) are executed on the learning grid points APT(j), APT(j+1) immediately above and below the sensor output value $AP_{A/D}$. The next step 129 is executed first based on APT(j−1) and APT(j) after the first execution of the steps 124 and 125 (the value of j here is its value the second time the answer at step 126 was negative), and the steps 130, 132 described hereinafter are executed based on flags $F_{-AP(j-1)}$, $F_{-AP(j)}$ after the step 125 has been executed twice.

At the step 129, a corrected value $AP_{A/D2}$ of the accelerator pedal position sensor output value $AP_{A/D}$ is calculated according to the following equation (4):

$$APA/D2 = \frac{AP_{A/D} - APT(j-1)}{APT(j) - APT(j-1)} \times (THT(j) - THT(j-1)) + THT(j-1) \quad (4)$$

The process of determining the learning grid points APT(i) and corrected value $AP_{A/D2}$ will now be described with reference to a table given below with specific examples, and to FIG. 4. The figures shown here are expressed in hexadecimal (HEX) notation.

| i | 0 | 1 | 2 | 3 |
|---|---|---|---|---|
| THT (i) | 00 | 20 | 36 | 4D |
| APB (i) | 00 | 06 | 08 | 0B |
| APT (i) | 00 | 24 | 30 | 49 |

First, learning grid points THT(i) are set, for example $THT_{(0)}=00$, $THT_{(1)}=20$, $THT_{(2)}=36$, $THT_{(4)}=4D$ . . . . If the output values $AP_{A/D}$ of the accelerator pedal position sensor when these learning grid points THT(i) coincide with the throttle valve opening sensor output value $TH_{A/D}$ (step 110 is affirmative), are within a tolerance range defined for example by permissible relative errors $APB_{(0)}=00$, $APB_{(1)}=06$, $APB_{(2)}=08$, $APB_{(3)}=0B$ centered on corresponding output values $TH_{A/D}$ or THT(i) values (step 113 is affirmative), the values of the learning grid points APT(i) based on the sensor output values $AP_{A/D}$, i.e. $APT_{(0)}=00$, $APT_{(1)}=24$, $APT_{(2)}=30$, $APT_{(3)}=49$, are learned (step 117, broken line in FIG. 4). This is however subject to the condition that learning grid points APT(i) do not lie outside the tolerance range defined by permissible relative error APB(i) values centered on corresponding learning reference grid points THT(i) (steps 124, 125).

Next, let us calculate the corrected value $AP_{A/D2}$ when the accelerator pedal position output value is for example 3C. As can be seen from FIG. 4, $AP_{A/D}=3C$ lies between $APT_{(2)}=30$ and $APT_{(3)}=49$, so j=3 is applied in the equation (4) above (steps 126, 128), and $$AP_{A/D2} = \frac{3C - 30}{49 - 30} \times (4D - 36) + 36 = 41$$

Provided there is no error when the throttle valve 4 and accelerator pedal 14 are operating with a 1:1 correspondence and the sensors give identical values, then even if an error should arise between the two sensors, the accelerator pedal position sensor output $AP_{A/D}=3C$ is corrected by using the learning values APT(i) to $AP_{A/D2}=41$ which coincides with the throttle valve opening sensor output value $TH_{A/D}=41$ (FIG. 4).

Returning to FIGS. 2a, 2b and 2c in the next steps 130 and 132, it is determined whether or not the flags $F_{-AP(j-1)}$, $F_{-AP(j)}$ set at the step 125, and in the steps 119, 120, are respectively equal to 1. If any of the answers should be negative (No), i.e. if the learning grid points $APT_{(j-1)}$ and APT(j) used in the step 129 have been incompletely learned, the program proceeds to a step 134; while if all the answers are affirmative (Yes), i.e. if the learning grid points APT(j−1) and APT(j) have been completely learned, the program proceeds to a step 133. However, if j=8 (the answer to the step 131 is affirmative), the step 132 is skipped as the flag $F_{-AP}(8)$ has not been set.

At the step 133, an opening difference assessment threshold value, $\theta_{STDYR}$ used in other routines, which is an assessment reference value for determining whether there is a difference between the opening commanded by the accelerator pedal to the throttle valve 4 and the actual opening of the throttle valve 4, is set to a fixed value $\theta_{APR}$ (corresponding for example to 2.8°) taking account of the hysteresis or aging variation of the sensor output value. At the step 134, as the learning is incomplete, the opening assessment threshold value $\theta_{STDYR}$ is set to a permissible relative error APB(j) with j having the value when the answer at the step 126 was negative, which is larger than the above fixed value $\theta_{APR}$, and the program is terminated.

If on the other hand the answer at the step 127 is affirmative (Yes), the corrected value $AP_{A/D2}$ is set to the learning grid point APT(8) as $AP_{A/D} > APT_{(8)}$ (step 135), and the program proceeds to the step 134.

Further, at a step 136, as it is unclear in which of the spaces between learning grid points APT(i) the accelerator pedal position sensor output value $AP_{A/D}$ lies, the control parameter j is set to 0, and the program proceeds to steps 124 to 128.

Although in the above described embodiment, the output value of the accelerator pedal position sensor is corrected based on the output value of the throttle valve opening sensor, alternatively the former may be corrected based on the latter.

Further, if any of the several learning grid points APT(j) are not learned over a long time period, the reliability of the learned value decreases. The time which has elapsed from the last learned point is then measured, and if it is greater than a predetermined time period (e.g. 6 months), the flag $F_{-AP(j)}$ representing learning completion for the learning grid point APT(j) may be reset to 0.

Further, instead of using the predetermined time period, the determination may be made on the basis of whether the running distance obtained by measuring a pulse signal from a wheel speed sensor is greater than a predetermined distance (e.g. 30,000 km), or on the basis of a cumulative value of engine rotational speed.

Further, in the above described embodiment, the learning is accomplished only with corresponding learning grid points APT(i) when the throttle valve opening sensor output value coincides with the learning grid point THT(i). However, there is also a possibility that relative errors between sensor output values may also arise with adjacent reference grid points THT(i−1), THT(i+1), and the learning may thus be carried out using learning quantities less than quantities for APT(i) even for learning grid points APT(i−1), APT(i+1) adjacent to corresponding learning grid points APT(i).

What is claimed:

1. A device for correcting errors between an output value from an accelerator pedal position sensor for detecting an operating position of an accelerator pedal of a vehicle, and an output value from a throttle valve position sensor for detecting a rotational position of a throttle valve installed in an intake pipe of an engine mounted on said vehicle, the device comprising comparison means for comparing the output value of one of said sensors with reference values consisting of a plurality of different values when said accelerator pedal and said throttle valve are operating in a 1:1 correspondence, learning means operable when one of said sensor output values corresponds to one of said reference values as a result of a comparison made by said comparison means, for learning the output value of the other of said sensors for each of said reference values, and correcting means for correcting the output value from said other sensor by learned values provided by said learning means.

2. A device as defined in claim I wherein, when the output value of said one of said sensors coincides with one of said reference values, said learning means performs said learning if a difference between the output values of said sensors is equal to or less than a first predetermined value, and does not perform said learning if it is greater than said first predetermined value.

3. A device as defined in claim 2 wherein said learning means initializes one of said learned values when a difference between one of said reference values and a corresponding value learned by said learning means is greater than a second predetermined value.

4. A device as defined in claim 3 wherein said first and second predetermined values are identical, and are set for each of said reference values.

5. A device as defined in claim 4 wherein said first and second predetermined values are set according to permissible errors which can be produced mechanically by said sensors.

* * * * *